(12) United States Patent
Mäckel et al.

(10) Patent No.: US 7,026,787 B2
(45) Date of Patent: Apr. 11, 2006

(54) METHOD AND DEVICE FOR DETERMINING THE STARTING CAPABILITY OF A VEHICLE

(75) Inventors: Rainer Mäckel, Königswinter (DE); Roger Zimmermann, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/478,993

(22) PCT Filed: Mar. 5, 2002

(86) PCT No.: PCT/EP02/02369

§ 371 (c)(1),
(2), (4) Date: Jul. 21, 2004

(87) PCT Pub. No.: WO02/096717

PCT Pub. Date: Dec. 5, 2002

(65) Prior Publication Data

US 2004/0239332 A1    Dec. 2, 2004

(30) Foreign Application Priority Data

May 26, 2001 (DE) ................................ 101 25 819

(51) Int. Cl.
*H02J 7/14* (2006.01)

(52) U.S. Cl. ...................................................... 320/104
(58) Field of Classification Search ................ 320/104, 320/132, 149, 150–153; 324/427, 429, 430, 324/431, 327

See application file for complete search history.

(56) References Cited

U.S. PATENT DOCUMENTS

| | | | |
|---|---|---|---|
| 6,118,252 A | | 9/2000 | Richter ........................ 320/132 |
| 6,268,712 B1 | * | 7/2001 | Laig-Horstebrock et al. .... 320/132 |
| 6,472,875 B1 | * | 10/2002 | Meyer ......................... 324/327 |

FOREIGN PATENT DOCUMENTS

| | | | |
|---|---|---|---|
| DE | 3712629 | | 10/1987 |
| DE | 19705634 | * | 9/1999 |
| DE | 1116958 | * | 7/2001 |
| EP | 0916959 | | 5/1999 |
| EP | 1094326 | | 4/2001 |
| WO | 99/17128 | | 4/1999 |

OTHER PUBLICATIONS

International Search Report.

\* cited by examiner

*Primary Examiner*—Pia Tibbits
(74) *Attorney, Agent, or Firm*—Crowell & Moring LLP

(57) ABSTRACT

A method for determining the ability of a vehicle to start, in order to detect the operational capability of a battery, in particular of a vehicle battery, in a particularly simple and reliable way. Current values and voltage values of the battery are sensed during a predefined time window, in particular while the vehicle is being started. An internal resistance of the battery is determined by reference to the current values and the voltage values by means of linear regression, and a reference resistance value for the starting behavior of the vehicle is determined by reference to a maximum value for the current and a minimum value for the voltage which are sensed within the predefined time window. A value which represents the ability to start is determined by reference to a comparison between the internal resistance and the reference resistance value.

18 Claims, 4 Drawing Sheets

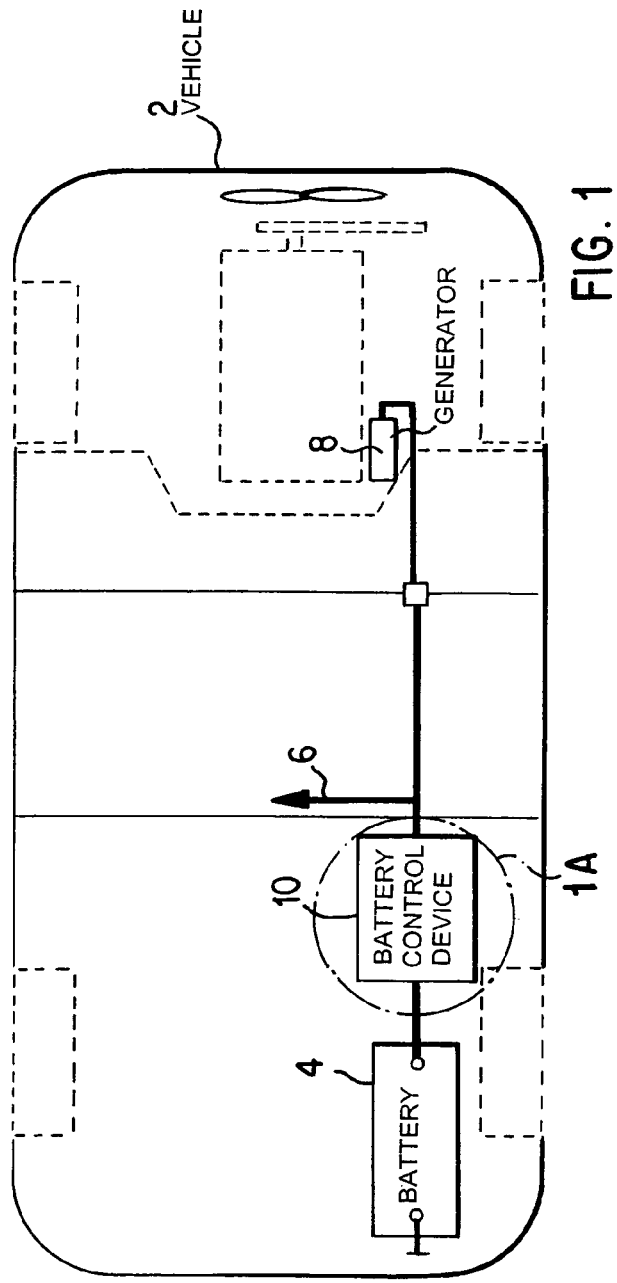
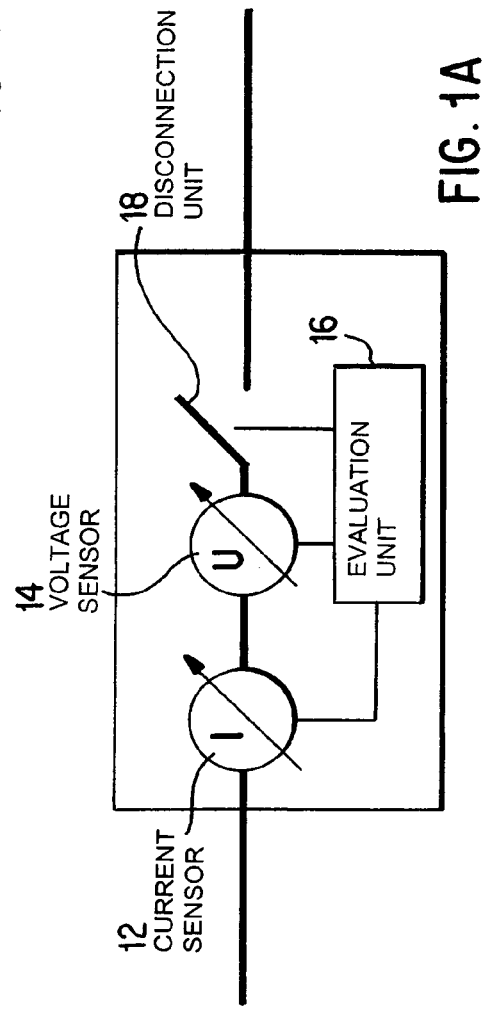

METHOD AND DEVICE FOR DETERMINING THE STARTING CAPABILITY OF A VEHICLE

This application claims the priority of German Patent document DE 101 25 819.4, filed 26 May 2001 (PCT International Application No. PCT/EP02/02369, filed 5 Mar. 2002), the disclosure of which is expressly incorporated by reference therein.

BACKGROUND AND SUMMARY OF THE INVENTION

The invention relates to a method for determining the ability of a vehicle to start, in particular during the starting process of the vehicle.

In vehicles, safety-related functions are being increasingly operated electrically, for example electric brakes. In order to ensure the operational capability of such safety-related components, they must be continuously supplied with electrical energy. To do this, it is known to provide two energy sources, specifically a battery and a generator, in the vehicle.

When the vehicle is turned off, the battery is usually loaded. Discharging of the battery may give rise to such a low battery charge state that starting or other functions of the vehicle are no longer ensured. Reliable information on the battery charge state is therefore necessary.

European Patent EP 0 916 959 A2 (U.S. equivalent, U.S. Pat. No. 6,118,252) discloses a method for determining the ability of the starter battery of a vehicle to start, in which method the voltage dip when the vehicle starts is compared with voltage values of a characteristic curve diagram. A display or alarm function is triggered when there is a deviation. Furthermore, German Patent DE 37 12 629 C2 discloses a measuring device for the remaining service life of a vehicle battery in which, by reference to the terminal voltage and the load current of the battery, the internal resistance of the battery is determined in a temperature-compensated fashion before and after the vehicle is started. By forming a ratio and by reference to a comparison with a limiting value, a signal is generated which indicates the battery service life which has been determined.

The object of the present invention is to specify a method for determining the ability of a vehicle to start which permits the operational capability of the battery to be detected in a particularly simple and reliable way. Furthermore, a particularly simple device for determining the ability to start is specified.

The object is achieved according to the invention by means of a method for determining the ability of a vehicle to start with current values and voltage values of a battery being sensed during a predefined time window, in particular while the vehicle is being started. An internal resistance of the battery is determined by reference to the current values and the voltage values by means of linear regression. A reference resistance value for the starting behavior of the vehicle is determined by reference to a maximum value for the current and a minimum value for the voltage which are sensed within the predefined time window. A value which represents the ability to start is determined by reference to a comparison between the internal resistance and the reference resistance value. The internal resistance of the battery is preferably determined by reference to the current and voltage values which are measured during the starting behavior. For this purpose, in particular the current values which represent the falling edge and the voltage values which represent the rising edge are determined. These values are used to determine the internal resistance by means of linear regression. The reference resistance value is preferably determined within a time window of the starting phase by reference to the maximum value for the current and the minimum value for the voltage which represent this time window. This ratio represents the resistance of the starter circuit, i.e. of the engine. Comparing the reference resistance value of the starter circuit with the internal resistance value of the battery permits reliable conclusions concerning the ability of the battery to start, without a complex measuring operation. In particular, the method for directly assessing the ability of the vehicle to start is made possible by reference to the operational capability of the battery. Furthermore, the method can be used independently of the type of vehicle or size of battery.

The value for the internal resistance of the battery is expediently monitored to determine whether it is equal to or drops below the reference resistance value of the starter circuit. When the value of the internal resistance is equal to or drops below the reference resistance value by at least 1% the engine is able to start.

If the value for the internal resistance of the battery is equal to or greater than the reference resistance value, a signal message is advantageously output. This ensures that, before the ability of the battery to start is lost, a signal message which indicates the critical state of the battery is output so that measures which are necessary for the ability to start can be timely mode.

The temperature of the battery and/or a starter circuit of the vehicle is preferably determined. This permits both the reference resistance of the starter circuit and the internal resistance of the battery to be determined as precisely as possible based on their dependence on temperature. As an alternative or in addition it is possible to determine the ability of the battery to start at a different temperature, and thus make predictions, on the basis of a currently sensed temperature of the battery and a currently sensed temperature of the starter circuit, in particular of the engine.

A value determined as a function of an instantaneously determined temperature of the battery and/or of the starter circuit, or a value which has been determined at a given time, is used to determine, in particular interpolate and extrapolate, the value for the internal resistance or reference resistance value which represents the ability to start at a different temperature, and thus at a later time. As a result, the ability of the battery to start can be predicted by taking into account the temperature profile over time. This ensures that the ability to start at a later time can be assessed when the temperature is dropping, in particular when the temperature of the starter circuit is dropping, for example at the temperature of the engine at which the starting power rises disproportionately.

The charge state of the battery is advantageously monitored and linked to the internal resistance of the battery in such a way that when its value drops below a limiting value for the internal resistance in a given charge state, the battery is disconnected from the on-board electrical system. This ensures that the battery is disconnected from the on-board electrical system in sufficient time when said battery is in a critical state. In particular, in the case of a relatively long inactive time of the vehicle during which the battery is permanently discharged, a critical state is detected in good time so that the battery can be disconnected if appropriate on-board electrical system.

The second-mentioned object is achieved according to the invention by means of a device for determining the ability of a vehicle to start with a current sensor for sensing current values and a voltage sensor for sensing voltage values of a battery during a predefined time window, in particular while the vehicle is being started. An evaluation unit is provided for determining an internal resistance of the battery by reference to the current values and the voltage values by means of linear regression. The evaluation unit also determines a reference resistance value for the starting behavior of the vehicle by reference to a maximum value for the current and a minimum value for the voltage which are sensed within the predefined time window. It is thus possible to determine a value which represents the ability to start by reference to a comparison between the internal resistance and the reference resistance value. This provides a device which is of particularly simple design and which can be used independently of the type of vehicle or type of battery.

BRIEF DESCRIPTION OF THE DRAWINGS

Exemplary embodiments of the invention are explained in more detail with reference to a drawing, in which:

FIG. 1 is a schematic view of a device for determining the ability of a vehicle to start, with a current sensor, a voltage sensor and an evaluation unit.

DETAILED DESCRIPTION OF THE PREFERRED EMBODIMENT

Figure 2:
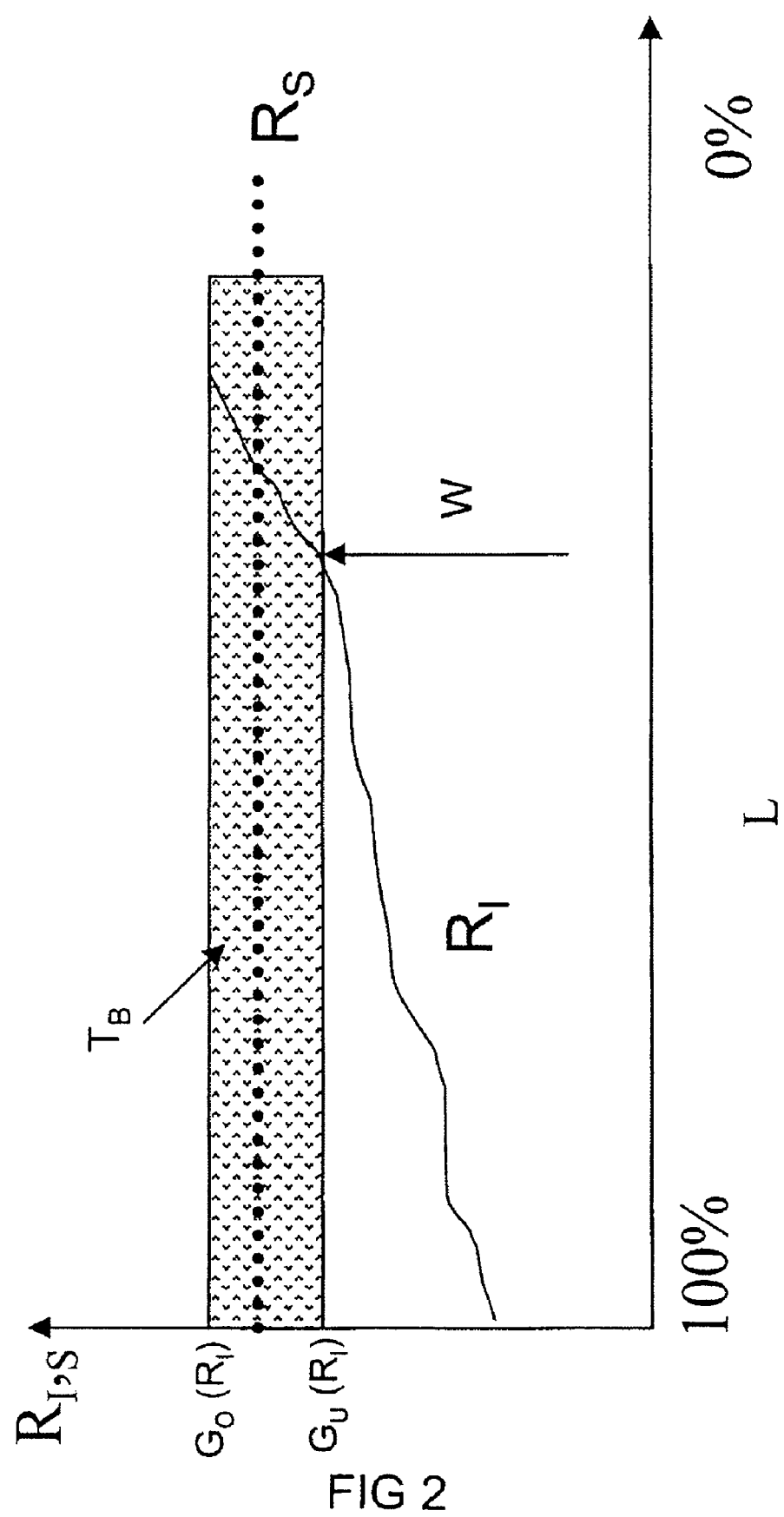
FIG. 2 is a diagram with a functional profile of the internal resistance and of the reference resistance as a function of the charge state of the battery.

FIG. 1 shows a device 1 for determining the ability of a vehicle 2 to start with a battery 4 for making available a voltage U for an on-board electrical system 6. The on-board electrical system 6 is supplied with voltage U of the battery 4. As a second power source it is possible for the on-board electrical system 6 to be supplied with voltage U from the generator 8 of the vehicle 2.

The device 1 comprises a means 10 for controlling the battery 4 (referred to below for short as battery control device 10). The battery control device 10 includes a current sensor 12 for sensing and determining current values I and a voltage sensor 14 for sensing and determining voltage values U of the battery 4. Depending on the type and design of the current sensor 12, a discharge current I which is obtained from the battery 4 and/or a charge current I which charges the battery 4 are sensed and determined. An evaluation unit 16 is provided for evaluating and processing the sensed current values I and voltage values U. Furthermore, a disconnection unit 18 is provided for disconnecting the battery 4 from the on-board electrical system 6 as a function of the presence of a predefinable operating state.

By means of the evaluation unit 16, an internal resistance $R_I$ of the battery 4 is determined by reference to the current values I and the voltage values U sensed within a predefined time window, by means of linear regression. The time window represents, in particulars the behavior of the voltage U and of the current I during the starting phase of the vehicle 2 or during a different predefined loading phase or quiescent phase of the battery 4. In other words, the time range which describes the starting behavior of the vehicle 2 is considered as the time window. The time range is selected so that the falling edge of the current I and the rising edge of the voltage U are sensed.

The evaluation unit 16 also determines a maximum value $I_{max}$ for the current I and a minimum value $U_{min}$ for the voltage U by reference to the current values I and voltage values U which are sensed in the time window. A reference resistance value $R_S$ for the starting behavior of the vehicle 2, which represents the resistance of the starter circuit of the vehicle 2, and in particular of the engine, is determined by reference to the maximum value $I_{max}$ and the minimum value $U_{min}$ which have been determined. Depending on the type and design of the evaluation unit 16, further criteria such as the aging state of the battery 4 and/or of the vehicle 2, or the capacitance of the battery, which influence the internal resistance $R_I$ of the battery 4 and of the reference resistance $R_S$, can be taken into account The internal resistance $R_I$ of the battery 4 and the reference resistance $R_S$ of the starter circuit are compared by the evaluation unit 16. A value which represents the ability to start is determined by reference to the result this comparison. For this purpose, the internal resistance $R_I$ and the reference resistance $R_S$ are compared with one another in such a way that a currently determined value of the internal resistance $R_I$ of the battery 4 is monitored to determine whether it drops below the reference resistance value $R_S$ of the starter circuit.

By way of example, FIG. 2 illustrates the functional profile of the internal resistance $R_I$ and of the reference resistance as a function of the charge stage L of the battery 4. This ensures that the charge state L of the battery 4, which significantly influences the internal resistance $R_I$ of the battery 4, is taken into account. If, for example, the battery 4 is permanently discharged, for example during a relatively long inactive time of the vehicle 2 at an airport, the charge state L can be monitored as follows. An upper limiting value $G_O$ and a lower limiting value $G_U$ are predefined for the internal resistance $R_I$ on the basis of the fact that the charge state L of the battery 4 is linked directly to its internal resistance $R_I$. A resulting tolerance range $T_B$ represents the critical range for the ability of the vehicle 2 to start. If the currently sensed value for the internal resistance $R_I$ lies below the lower limiting value $G_U$ and/or below the reference resistance value $R_s$ of the starter circuit, it is ensured that the engine can start. By contrast, if the value of the internal resistance $R_I$ is equal to or greater than the lower limiting value $G_U$ and/or approximately equal to the reference resistance value $R_S$, the ability of the vehicle 2 to start is at least at risk, or is not present. In this case, in which the value of the internal resistance $R_I$ lies within the tolerance range $T_B$, a signal message M is output audibly or visually by means of the evaluation unit 16. This signal message or warning message M indicates to a user of the vehicle 2 that the ability to start is only present to a conditional degree, or is no longer present. As an alternative or in addition, the signal message M brings about triggering of the disconnection unit 18 which disconnects the battery 4 from the on-board electrical system 6. In the case of a stationary vehicle 2, the battery 4 is not connected to the on-board electrical system 6 again until directly before the start, by closing the disconnection unit 18.

Figure 3:
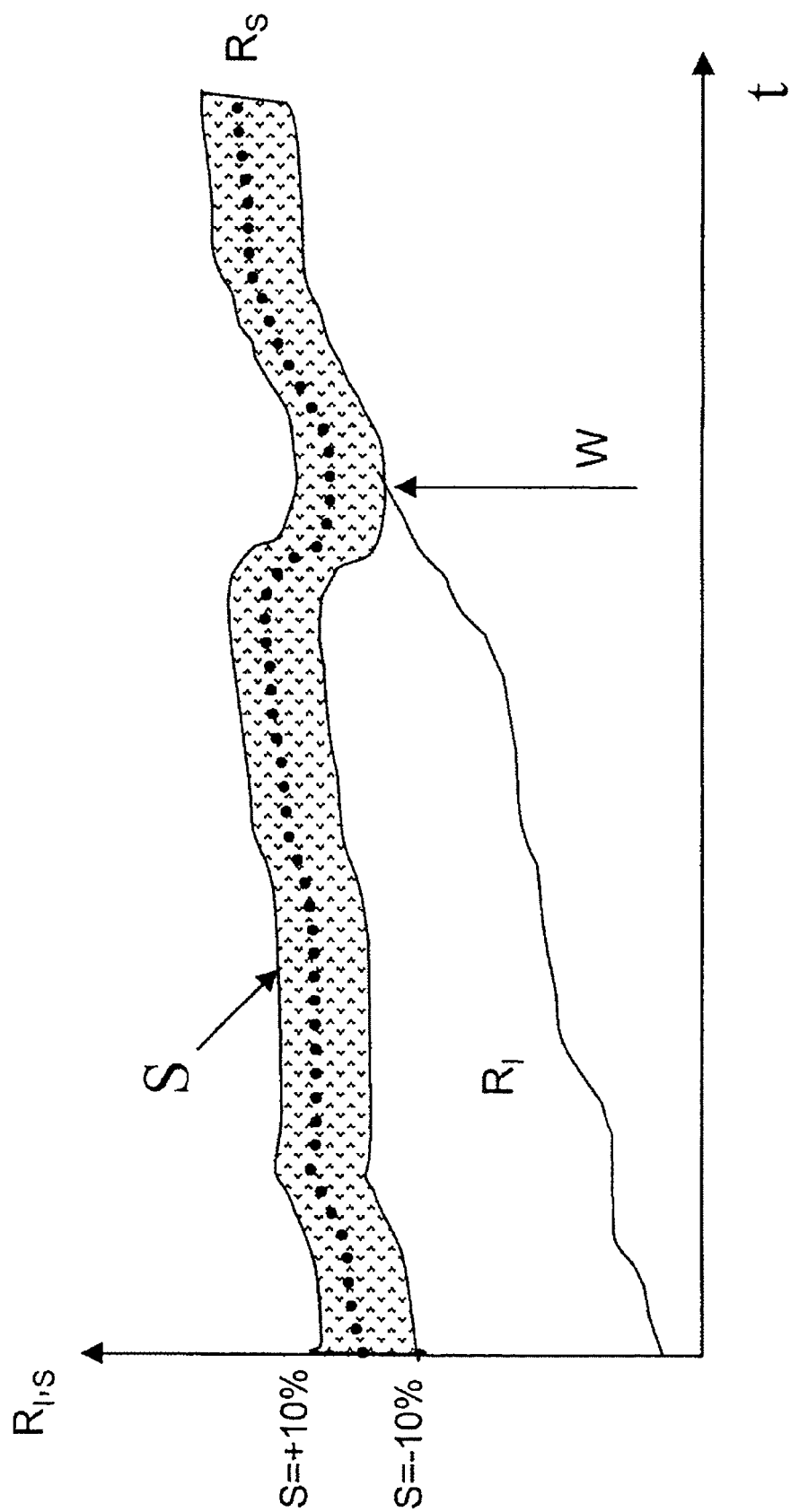
FIG. 3 is a diagram with the time profile of the internal resistance and of the reference resistance.

FIG. 3 illustrates by way of example the internal resistance $R_I$ and the reference resistance $R_S$ as a function of the time. Due to the age of the vehicle 2, in particular due to abrasion in cylinders and due to aging of the engine oil, the reference resistance value $R_S$ of the starter circuit changes as a function of the time t. As a further possibility, the reference resistance $R_S$ is continuously determined by means of the evaluation unit 16. In order to determine the value which represents the ability to start, a dynamic threshold value S of +/−2% is assigned to the reference resistance value $R_S$.

When the reference resistance value $R_S$ of the starter circuit is compared with the currently determined internal resistance $R_I$ of the battery 4, said internal resistance is monitored to determine whether it drops below the reference resistance value $R_S$, in particular whether it drops below the dynamic threshold value S. If the currently determined value of the internal resistance $R_I$ drops below the reference resistance value $R_S$ by −11%, and thus below the lower threshold value S of −10%, it is ensured that the vehicle 2 can start. If the internal resistance $R_I$ is equal to or greater than the lower threshold value of −10% of the reference resistance value $R_S$, the ability to start is at least at risk or is not present. In this case, a signal message M which represents the reduced ability to start and which, if appropriate, is output to activate the disconnection unit 18. The threshold value S for the reference resistance value $R_S$ is predefined as a function of the type of vehicle, type of battery or age. For example, the threshold value S varies between 1% to 20% of the reference resistance value $R_S$ of the starter circuit, in particular of the engine.

Figure 4:
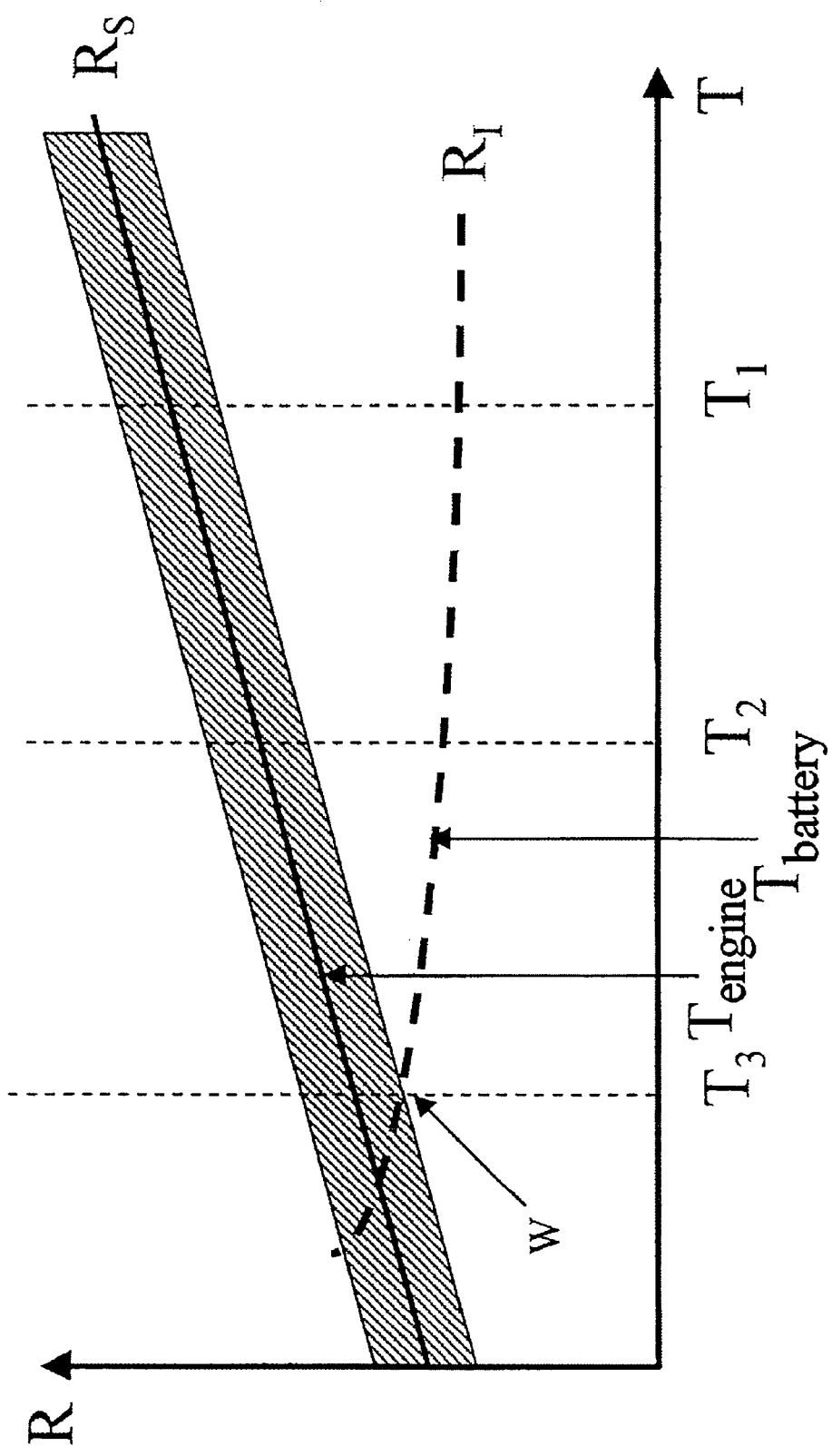
FIG. 4 is a diagram with the internal resistance and the reference resistance as a function of the temperature.

Both the internal resistance $R_I$ of the battery 4 and the resistance $R_s$ of the starter circuit are temperature dependent. The consideration of this temperature dependency is illustrated by way of example in FIG. 4. FIG. 4 shows the internal resistance $R_I$ and the reference resistance $R_S$ as a function of the temperature T. On the basis of a currently sensed temperature T1 for the battery 4 or for the starter circuit, in particular for the engine, an ability of the vehicle 2 to start at a different temperature T2 or T3 is determined by the evaluation unit 16. For this purpose, the instantaneous temperature T1 is sensed by a temperature sensor (not illustrated in more detail). Depending on the type and design of the device 1, the temperature T of the battery 4 and/or of the starter circuit, in particular of the engine, can be sensed. The temperatures $T_{battery}$ and $T_{engine}$ are sensed separately for the battery 4 and the starter circuit and are used to determine an ability to start at a different temperature T2. By interpolation and extrapolation, the internal resistance $R_I$ and/or the reference resistance $R_S$ at a different temperature T2 and T3 are determined with reference to the instantaneously determined temperature T1. For the respective temperature T2 or T3, the respectively associated value of the internal resistance $R_I$ is then compared with the associated reference resistance value $R_S$ by the evaluation unit 16. If the distance between the reference resistance value $R_S$ and the value of the internal resistance $R_I$ for the respective temperature T2 is sufficiently large, i.e. if the value of the internal resistance $R_I$ drops below the reference resistance value $R_S$, the vehicle is able to start. At the temperature T3, the internal resistance $R_I$ is approximately equal to the reference resistance value $R_S$. In this case, it is no longer ensured that the vehicle can start.

The invention claimed is:

1. A method for determining the ability of a vehicle to start, comprising the steps of:

sensing current values (I) and voltage values (U) of a battery during a predefined time window, determining an internal resistance ($R_I$) of the battery by reference to the current values (I) and the voltage values (U) by means of linear regression, determining a reference resistance value ($R_S$) for the starting behavior of the vehicle by reference to a maximum value ($I_{MAX}$) for the current (I) and a minimum value ($U_{MIN}$) for the voltage (U) which are sensed within the predefined time window and determining a value which represents the ability to start by reference to a comparison between the internal resistance ($R_I$) and the reference resistance value ($R_S$).

2. The method as claimed in claim 1, wherein a value for the internal resistance ($R_I$) of the battery is monitored to determine whether it drops below the reference resistance value ($R_S$).

3. The method as claimed in claim 2, wherein as a function of an instantaneously determined temperature (T1) of at least one of the battery and the starter circuit, the value which represents the ability to start is determined for another temperature (T2, T3) by reference to the value, which represents this temperature (T1), for the internal resistance ($R_I$) or reference resistance value ($R_S$).

4. The method as claimed in claim 1, wherein a signal message (M) is output in when the value for the internal resistance ($R_I$) of the battery is equal to or greater than the reference resistance value ($R_S$).

5. The method according to claim 4, wherein a temperature (T) of at least one of the battery and a starter circuit of the vehicle is determined.

6. The method according to claim 1, wherein a temperature (T) of at least one of the battery and a starter circuit of the vehicle is determined.

7. The method as claimed in claim 1, wherein as a function of an instantaneously determined temperature (T1) of at least one of the battery and the starter circuit, the value which represents the ability to start is determined for another temperature (T2, T3) by reference to the value, which represents this temperature (T1), for the internal resistance ($R_I$) or reference resistance value ($R_S$).

8. The method as claimed in claim 1, wherein charge start (L) of the battery is monitored and is linked to the internal resistance ($R_I$) of the battery in such a way that, when the value drops below a limiting value ($G_U$) for the internal resistance ($R_I$) for a given charge state (L), the battery is disconnected from the on-board electrical system.

9. A device for determining the ability of a vehicle to start, said device comprising:

a current sensor for sensing current values (I) and a voltage sensor for sensing voltage values (U) of a battery during a predefined time window;

an evaluation unit for determining an internal resistance ($R_I$) of the battery by reference to the current values (I) and the voltage values (U) by means of linear regression, and for determining a reference resistance value ($R_S$) for the starting behavior of the vehicle by reference to a maximum value ($I_{MAX}$) for the current (I) and a minimum value ($U_{MIN}$) for the voltage (U) which are sensed within the predefined time window, whereby it is possible to determine a value which represents the ability to start by reference to a comparison between the internal resistance ($R_I$) and the reference resistance value ($R_S$).

10. A method for determining the starting status of an automobile, comprising the steps of:

measuring current and voltage values of a battery;

determining an internal resistance of the battery as a function of said current and voltage values;

providing a reference resistance value as a function of a maximum current value and a minimum voltage value during a predetermined interval;

comparing said internal resistance value with said reference resistance value.

11. The method as claimed in claim 10, wherein a value for the internal resistance ($R_I$) of the battery is monitored to determine whether it drops below the reference resistance value ($R_S$).

12. The method as claimed in claim 10, wherein, a signal message (M) is output in when the value for the internal resistance ($R_I$) of the battery is equal to or greater than the reference resistance value ($R_S$).

13. The method according to claim 10, wherein a temperature (T) of at least one of the battery and a starter circuit of the vehicle is determined.

14. The method as claimed in claim 10, wherein, as a function of an instantaneously determined temperature (T1) of at least one of the battery and the starter circuit, the value which represents the ability to start is determined for another temperature (T2, T3) by reference to the value, which represents this temperature (T1), for the internal resistance ($R_I$) or reference resistance value ($R_S$).

15. The method as claimed in claim 10, wherein charge start (L) of the battery is monitored and is linked to the internal resistance ($R_I$) of the battery in such a way that, when the value drops below a limiting value ($G_U$) for the internal resistance ($R_I$) for a given charge state (L), the battery is disconnected from the on-board electrical system.

16. The device according to claim 9, including means for monitoring a value for the internal resistances of the battery to determine whether said internally resistance of a battery drops below the reference resistance value.

17. The device claimed at claim 9, further including a means for outputting a signal message when the value for the internal resistances of the battery is equal to or greater than the reference resistances value.

18. The device claimed at claim 9, further including a sensor for determining a temperature of at least one of the battery and a starter circuit of the vehicle.

* * * * *